United States Patent
Aiello

(10) Patent No.: US 6,430,211 B1
(45) Date of Patent: Aug. 6, 2002

(54) FREQUENCY HOPPING FOR BASEBAND TRANSMITTERS

(75) Inventor: G. Roberto Aiello, Palo Alto, CA (US)

(73) Assignee: Pulse-Link, Inc., San Diego, CA (US)

( * ) Notice: Subject to any disclaimer, the term of this patent is extended or adjusted under 35 U.S.C. 154(b) by 0 days.

(21) Appl. No.: 09/393,040

(22) Filed: Sep. 9, 1999

(51) Int. Cl.[7] .............................................. H04B 1/713
(52) U.S. Cl. ...................................... 375/135; 375/296
(58) Field of Search .............................. 375/132, 133, 375/135, 285, 295, 296

(56) References Cited

U.S. PATENT DOCUMENTS 5,156,005 A * 10/1992 Redlich ...................... 318/811
5,361,072 A * 11/1994 Barrick et al. ............... 342/133
5,646,623 A * 7/1997 Walters et al. ............... 342/112

* cited by examiner

Primary Examiner—Don N. Vo
(74) Attorney, Agent, or Firm—Sierra Patent Group, Ltd.

(57) ABSTRACT

A method which allows for operating a baseband transmitter and provides reduced interference to a narrowband receiver having a passband around a frequency f. The baseband transmitter generates pulses at a nominal pulse repetition rate having at least one harmonic falling within the passband of the narrowband receiver, and then continuously varies the nominal pulse repetition rate in amounts such that the average time that the harmonic falls within the passband is less than 100%.

10 Claims, 5 Drawing Sheets

FREQUENCY HOPPING FOR BASEBAND TRANSMITTERS

BACKGROUND OF THE INVENTION

1. Field of the Invention

The present invention relates to frequency hopping spread spectrum techniques for reducing interference to narrowband receivers caused by baseband transmitters. More particularly, the present invention relates to frequency hopping spread spectrum techniques which slightly modify the pulse repetition rate generated by a baseband transmitter, thereby reducing interference to narrowband receivers.

2. The Prior Art

Spread-spectrum signals for digital communications were originally developed and used for military communications either to provide resistance to jamming or to hide the signal by transmitting it at low power and, thus, make it difficult for an unintended listener to detect its presence in noise. More recently, spread-spectrum signals have been used to provide reliable communications in a variety of civilian applications, including mobile vehicular communications.

There are several types of spread spectrum signals. In one type, the basic elements of a spread spectrum digital communication system include a channel encoder, modulator, channel decoder, demodulator, and two synchronized sequence generators, one which interfaces with the modulator at the transmitting end and the second which interfaces with a demodulator at the receiving end. These two generators produce a binary-valued sequence that is used to periodically change the carrier frequency and thus spread the transmitted signal frequency at the modulator and to follow the carrier frequency of the received signals at the demodulator.

In carrier-based frequency-hopped spread spectrum the available channel bandwidth is subdivided into a large number of non-overlapping frequency slots. In any signaling interval the transmitted signal carrier occupies one of the available frequency slots. The selection of the frequency slots in each signal interval is made either sequentially or pseudorandomly according to the output from a pseudo-noise generator. The receiver tuning follows the frequency hopping of the transmitted carrier.

Additionally, baseband wireless systems, also knows as ultra wideband (UWB) are well-known in the art of digital communications. These baseband wireless systems have the potential to produce interference to narrowband receivers, when one of the signal's frequency harmonics falls within the narrowband receiver bandwidth.

Neither of these approaches teach an apparatus or method using frequency hopping spread spectrum technology to reduce the amount of interference produced by a baseband transmitter to narrowband receivers.

Accordingly it is an object of the invention to provide an apparatus and a method to reduce the amount of interference to narrowband receivers produced by a baseband transmitter.

It is a further object to provide an apparatus and a method for reducing the interference to narrowband receivers by slightly modifying the pulse repetition rate generated by a baseband transmitter, so that transmitted signals which fall within the frequency range of the narrowband receiver appear intermittently.

Other objects, together with the foregoing are attained in the exercise of the invention in the following description and resulting the embodiment illustrated in the accompanying drawings.

BRIEF DESCRIPTION OF THE INVENTION

This present invention is a baseband frequency hopping apparatus and method which reduces the amount of interference generated by a baseband transmitter to narrowband receivers. In the present invention, the baseband transmitter may operate as a wireless transmitter or as a "wired" transmitter which uses electrical cable, optical cable, or other cabling techniques to connect the baseband transmitter to a receiver. To accomplish this objective the invention periodically modifies the pulse repetition rate of the baseband transmitter. Transmitted signals which fall within the frequency range of the narrowband receiver appear intermittently, thus reducing interference to the narrowband receiver.

The present invention comprises a baseband transmitter configured to transmit a plurality of pulses with varying pulse repetition rates. The duration of the transmission (TT) is divisible into time periods (T) (also referred to herein as "data frames"). Each time period (T) is further divisible into time slots (ts) (also referred to herein as "data slots") which each have a specific pulse repetition frequency (f). The pulse repetition frequency (f) is the frequency at which the pulses are transmitted by the transmitter. The pulse repetition frequency changes for each time slot. The pulse repetition frequency may change at a constant rate or at a variable rate.

The present invention includes a synchronization sequence which selects a synchronization time slot and its corresponding pulse repetition frequency to generate signals for synchronizing the baseband transmitter to a baseband spread spectrum receiver.

In operation, the transmitter generates signals at a particular pulse repetition frequency. The pulse repetition rate of these transmitted pulses may fall within the receiving bandwidth of one or more narrowband receivers and may result in interference to narrowband receivers. To avoid such interference, the pulse repetition frequency of the baseband transmitter is offset for each time slot, either by a fixed frequency offset or by another manner.

The frequency offset reduces interference to narrowband receivers by varying the time between adjacent pulses such that the pulse repetition rate does not fall within the passband of a tuned narrowband receiver for any appreciable time.

In the present invention, frequency hopping is achieved by changing the pulse repetition frequency for each time slot. Thus the change in time slot varies the pulse repetition frequency and the duty cycle. Note that if the duty cycle is less than 100%, then the transmitter signals appear as bursts.

An additional benefit is derived if the time slot is less than the receiver's filter time constant. If the time slot is smaller than the filter time constant of the receiver, the peak and average power communicated to the receiver is significantly reduced.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

This present invention reduces the amount of interference generated by a baseband transmitter to narrowband receivers using frequency hopping techniques. In operation, the present invention reduces the interference to one or more narrowband receivers by periodically modifying the pulse repetition rate generated by the baseband transmitter, so that transmitted signals fall within the frequency range of the narrowband receiver only intermittently. The baseband transmitter may operate as a wireless transmitter or as a "wired" transmitter which uses electrical cable, optical cable, or other cabling techniques to connect the baseband transmitter to a receiver.

Figure 1:
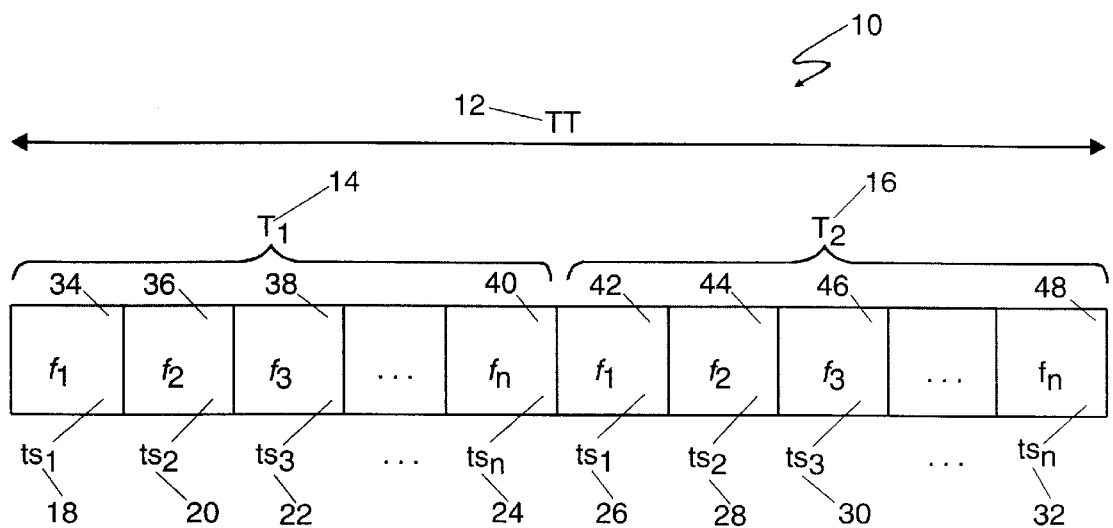
FIG. 1 shows a time period divisible into time slots where each time slot has a particular frequency offset.

The baseband transmitter is configured to transmit a plurality of signals with varying pulse repetition rates for the duration the transmitter is activated. Referring to FIG. 1 there is shown a diagram 10 of two time periods divisible into time slots having variable pulse repetition frequencies. By way of example and not of limitation, the duration of transmission 12 (identified as TT) for the baseband transmitter is divisible into time periods (T) having a particular length. In the illustrated example, two time periods 14 and 16 (identified as $T_1$ and $T_2$, respectively) are shown. Each time period 14 and 16 is further divisible into time slots 18, 20, 22, 24, 26, 28, 30, and 32 (identified as $ts_1, ts_2, ts_3, \ldots,$ $ts_n$ for each time period). Furthermore, each time slot has an associated specific pulse repetition frequency 34, 36, 38, 40, 42, 44, 46 and 48 (identified as $f_1, f_2, f_3, \ldots, f_n$). The pulse repetition frequency is the frequency at which the pulses are transmitted by the transmitter. Note, the pulse repetition frequency varies between time slots within a given time period.

Figure 2:
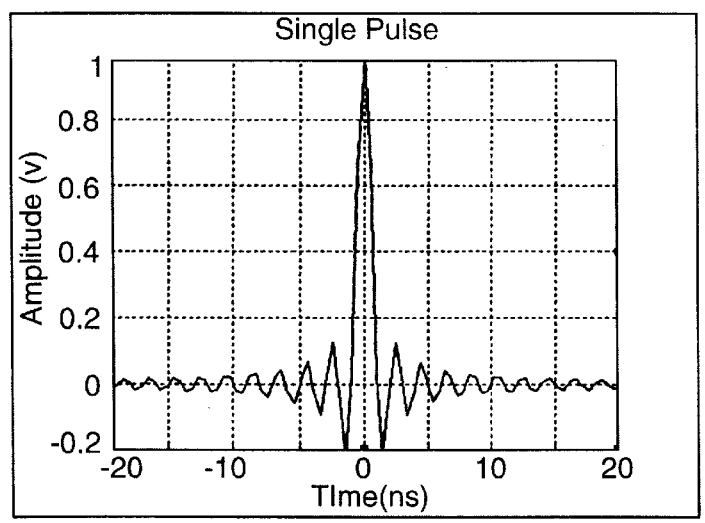
FIG. 2 is a transmitted pulse shown in the time domain.

Referring to FIG. 2 there is shown a signal 50 generated by the baseband transmitter of the present invention. Signal 50 is a single pulse shown in the time domain. A series of these signals are transmitted by the baseband transmitter to a baseband receiver. It shall be appreciated by those with ordinary skill in the art that the present invention has a synchronization sequence for synchronizing the baseband transmitter to a baseband receiver.

Figure 3:
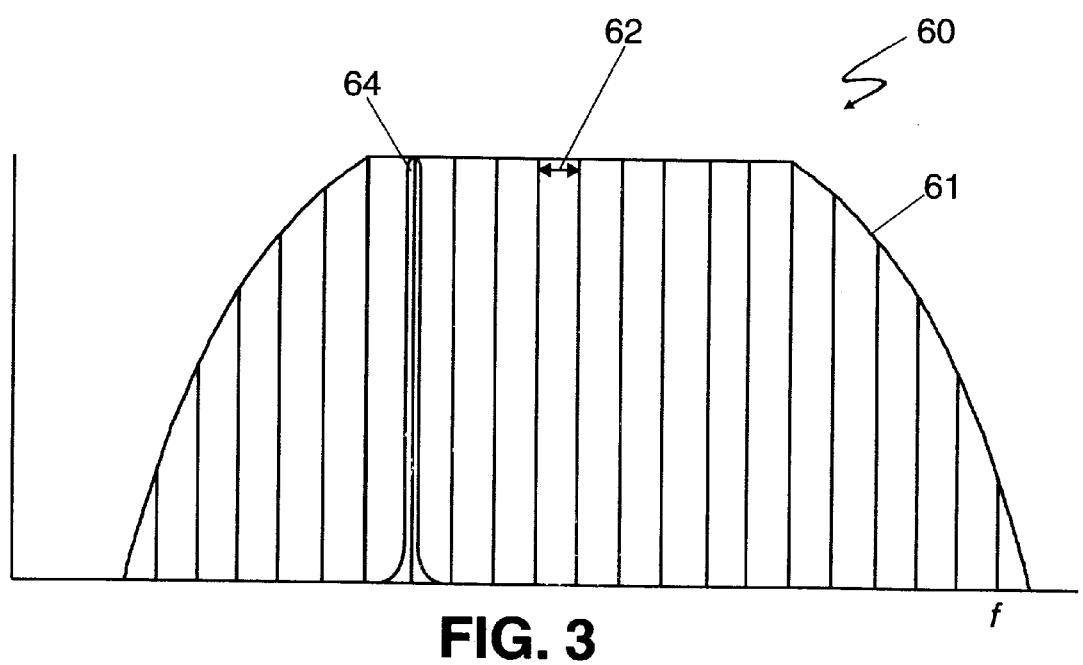
FIG. 3 is a pulse repetition frequency spectrum and the receiving frequency range for a narrowband receiver.

During transmission, the transmitter baseband signals may interfere with one or more narrowband receivers. Referring now to FIG. 3 there is shown a diagram 60 of the pulse repetition frequency spectrum for a baseband transmitter and the receiving frequency range of a narrowband receiver. The harmonic signals for the transmitted pulse are represented by lines surrounded by an envelope 61. The pulse repetition frequency in FIG. 3 is identified by the even spacing 62 between each of the signals. In operation, the pulse repetition frequency is pre-defined for each time slot. For illustrative purposes FIG. 3 also shows that the frequency range 64 for a narrowband receiver. Notice that one of the harmonic signals falls within the frequency range 64.

For illustrative purposes only, if the baseband transmitter transmits signals between the 1.0 GHz to 3.0 GHz range, narrowband receivers such as Personal Communication Systems (PCS) which operate at 1.9 GHz may receive baseband transmitted signals. Other narrowband receivers which operate on frequencies assigned to other radio services may also be affected.

Figure 4:
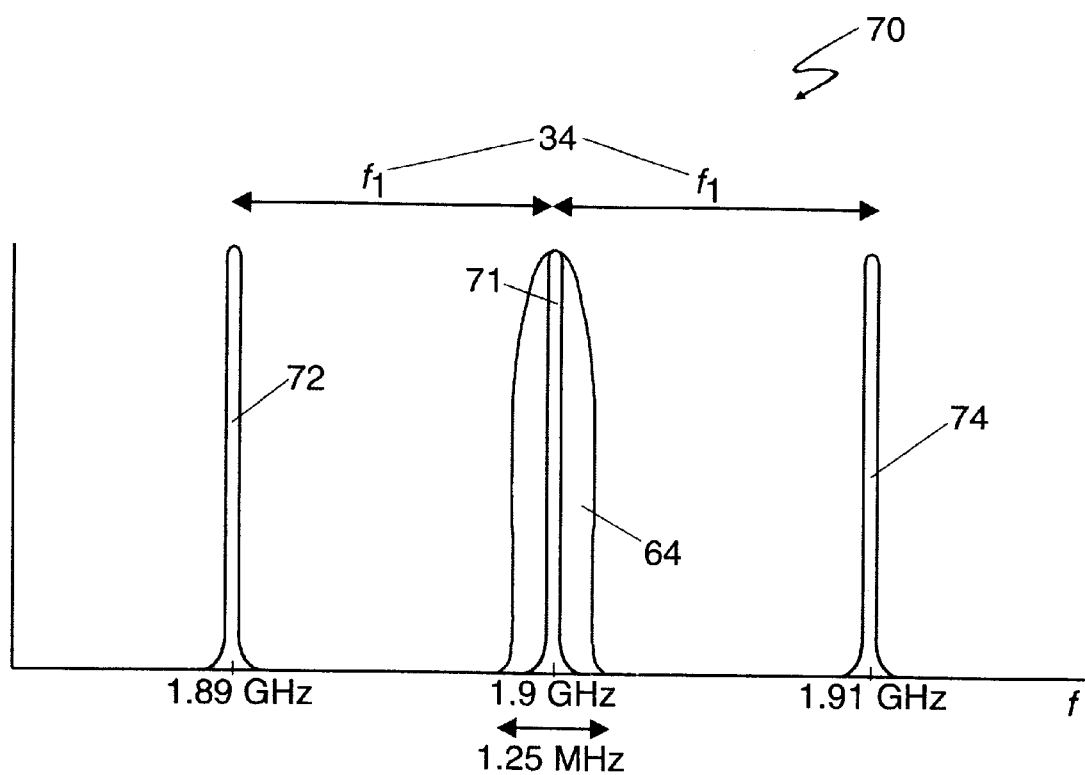
FIG. 4 is a magnified view of FIG. 3 which overlaps with the receiving frequency range for a narrowband receiver.

Referring to FIG. 4 there is shown an illustrative example 70 which depicts a magnified view of FIG. 3. By way of example and not of limitation, the harmonic signals of FIG. 4 have a pulse repetition frequency 34 of 10 MHz which is identified as $f_1$. If, for example, the narrowband receiver 64 operates at the Personal Communication System (PCS) frequency of 1.9 GHz having a bandwidth of 1.25 MHz. Notice that one of transmitted harmonic signals 71 is received by the PCS receiver operating at the 1.900 GHz frequency. The other transmitted harmonic signals 72 and 74 have transmission frequencies of 1.890 GHz and 1.910 GHz, respectively, and are not received by the PCS receiver. Note that if the baseband transmitter operates with a fixed pulse repetition frequency of 10.00 MHz, then the transmitted signals may be detected by, and interfere with the narrowband PCS receiver.

Figure 5:
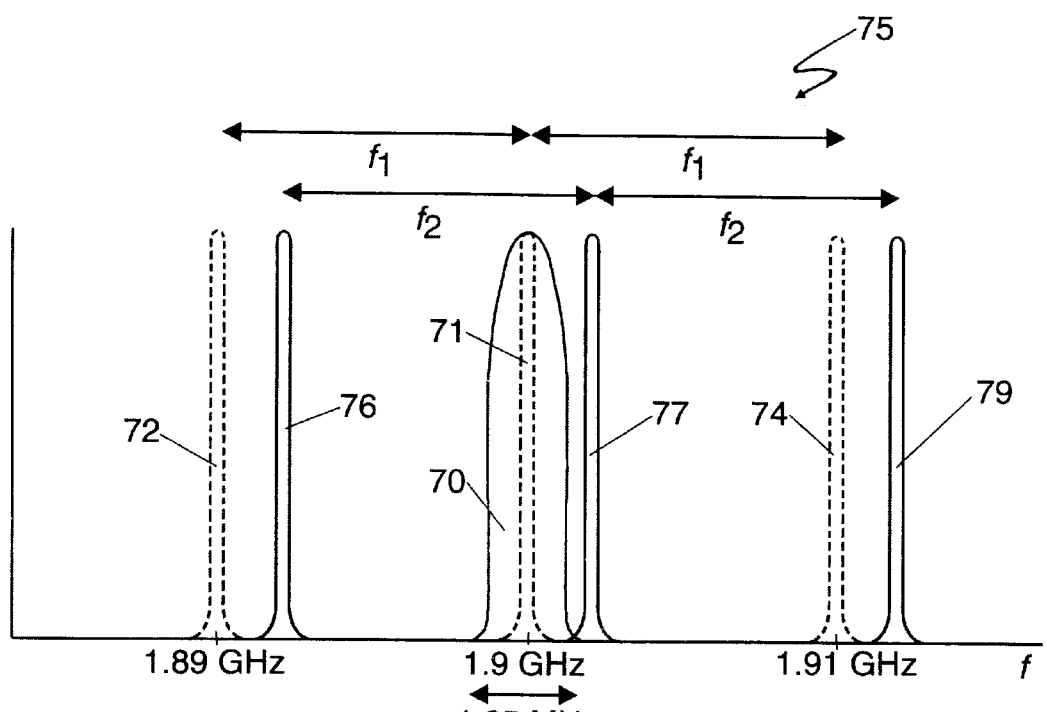
FIG. 5 is a view where the pulse repetition frequency of FIG. 4 is modified.

Referring to FIG. 5 there is shown an illustrative example 75 of the effect of having one pulse repetition frequency for one time slot and another pulse repetition frequency for a second time slot. In operation, the present invention transmits signals at a pulse repetition frequency which changes for each time slot. In one embodiment, the pulse repetition frequency may change at a constant rate such as 0.02 MHz, which results in a $f_1$ of 10.00 MHz for $ts_1$, an $f_2$ of 10.02 MHz for $ts_2$ and an $f_3$ of 10.04 MHz for $ts_3$. Such a frequency offset results in the transmitted signals of the second time slot having a pulse repetition frequency of 10.02 MHz, and are identified as $f_2$ in FIG. 5. The transmitted signals having a pulse repetition frequency of 10.02 MHz are identified as signals 76, 77 and 79 and have an approximate transmission frequency of 1.894 GHz, 1.904 GHz and 1.914 GHz, respectively. Since the PCS receiving frequency is 1.9 GHz with a bandwidth of 1.25 MHz, the transmitted signals having a pulse repetition frequency of 10.02 MHz fall outside the receiving frequency envelope of the narrowband receiver.

Alternatively, the pulse repetition frequency may change at a variable frequency rate so the pulse repetition frequency of $f_1$ is 10.00 MHz for $ts_1$, for $f_2$ is 10.10 at $ts_2$, and for $f_3$ is 10.05 at $ts_3$. It shall be appreciated by those of ordinary skill in the art that the number of time slots and the pulse repetition frequency for each time slot may be manipulated to avoid interference with the narrowband receivers. The examples provided above are presented to describe the concept of the present invention and not a limitation.

As shown above, modifying the pulse repetition frequency reduces interference by varying the duty cycle. The duty cycle is defined as the ratio between the time in which the pulses are "on" and the time in which they are "off" for the particular frequency and bandwidth of the narrowband receiver. When the transmitted signal's duty cycle is 100% and the narrowband receiver captures only a single transmitted pulse, the interference may appear as a sine wave to a narrowband receiver. When the duty cycle is less than 100%, the transmitter's pulses appear in bursts and the interference to the receiver is reduced.

In the present invention, the frequency offset or change is only active for the duration of the time slot, thus the duty cycle is less than 100%, and the pulses generated by the transmitter appear as bursts. "Frequency hopping" is achieved by changing the pulse repetition frequency for each time slot, which varies the pulse repetition frequency and the duty cycle.

Figure 6:
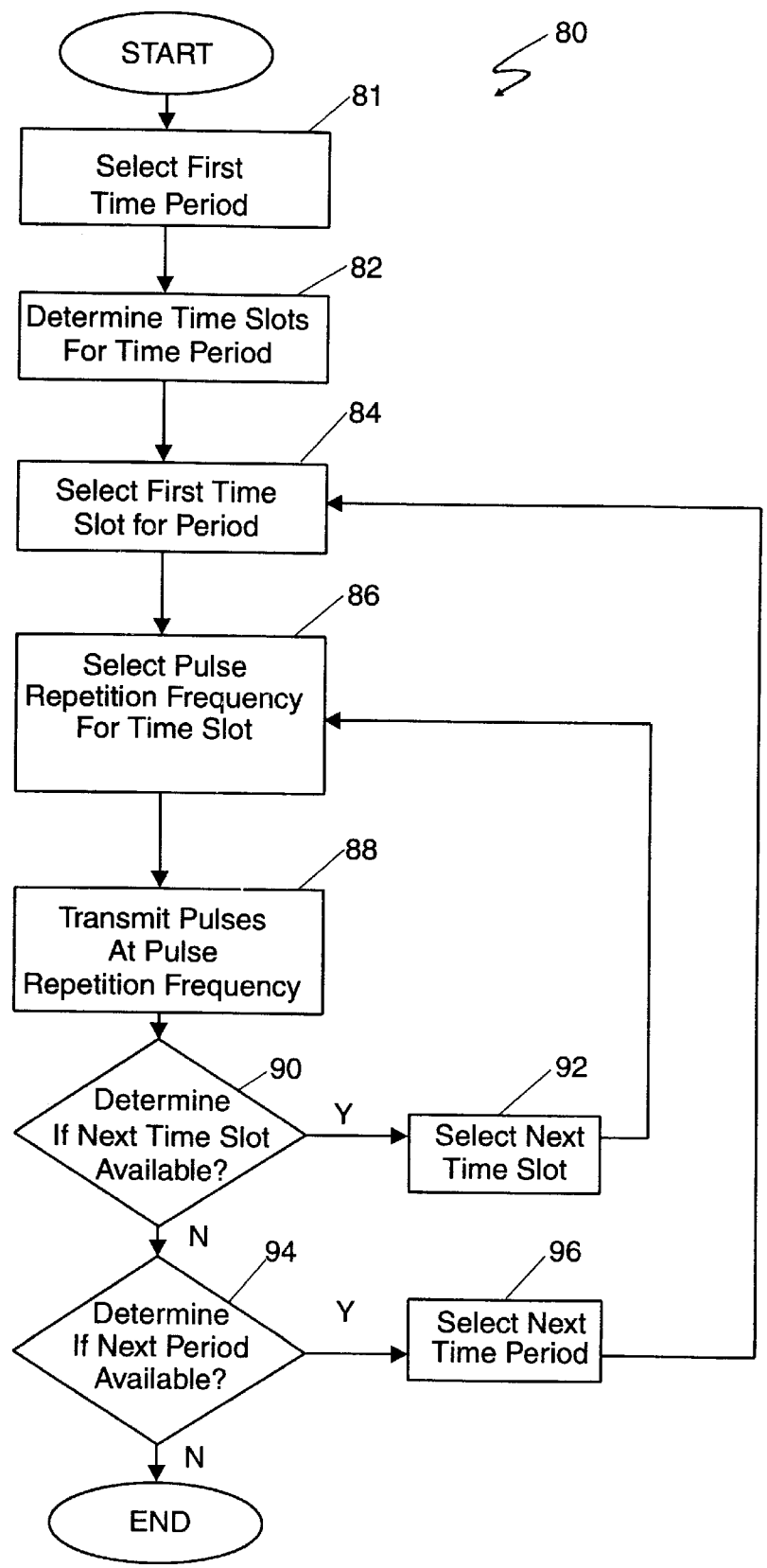
FIG. 6 is a functional block diagram of the steps used in baseband frequency hopping.

Referring to FIG. 6 there is shown a functional block diagram of the steps used in frequency hopping for this invention.

Referring to FIG. 6, the method 80 beginning at block 81 shows a selection of a first time period. As previously described, the duration of baseband transmission is divisible into time periods having a particular length. The selection of a first time period provides for the initialization of the baseband transmitter.

In block 82, the transmitter determines the characteristics of the time slots. The time slot characteristics includes the number of time slots, the duration of each time slot and the pulse repetition frequency for each time slot.

In block 84, the method selects the first time slot for the selected time period according to the determination made in block 82.

The method proceeds to block 86, where the pulse repetition frequency is selected for the time slot determined by block 84.

In block 88, the pulses are transmitted at the pulse repetition frequency selected in block 86.

In block 90, the method determines if the next time slot is available for transmission. If yes, then the method proceeds to block 92 where the next available time slot is selected, and then back to block 86 where the pulse repetition frequency is selected for transmission in block 88.

If in block 90 the next time slot is not available, then the method proceeds to block 94 to determine if the next time period is available. If according to block 94 the next time period is available, the method proceeds to block 96 to select the next time period and then to block 84 as previously described.

If in block 94 the next time period is not available, then the transmission is complete and the method has ended.

Although not shown, it shall be appreciated by those skilled in the art of digital communication that the present invention has a synchronization sequence which includes synchronizing the baseband transmitter with the baseband receiver. Additionally, selection of a synchronization time slot and sysnchronization pulse repetition frequency may be used to generate pulses for synchronizing the baseband transmitter to a baseband receiver.

An additional benefit in the reduction of interference to the narrowband receiver is derived if the time slot is less than the receiver's filter time constant. If the time slot is smaller than the filter time constant, the capacitive component of the circuit is not fully charged. This results in the peak and average power communicated to the receiver being significantly reduced.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for operating a baseband transmitter for providing reduced interference within a passband around a frequency f, comprising:

generating pulses at a nominal pulse repetition frequency (PRF), said PRF having at least one harmonic falling within the passband around the frequency f; and continuously varying said nominal PRF in amounts such that the average time that said at least one harmonic falls within said passband is less than 100%.

2. A method for operating a baseband transmitter as recited in claim 1 wherein continuously varying said nominal PRF comprises varying said PRF in a constant incremental manner.

3. A method for operating a baseband transmitter as recited in claim 2 wherein varying said PRF in a constant incremental manner comprises repeatably varying said PRF during transmitter operation.

4. A method for operating a baseband transmitter as recited in claim 1 wherein continuously varying said nominal PRF comprises varying said PRF in a variable manner.

5. A method for operating a baseband transmitter as recited in claim 4 wherein varying said PRF in a variable incremental manner comprises repeatably varying said PRF during transmitter operation.

6. In a baseband transmitter transmitting data frames, where each data frame divided into a plurality of data slots, a method for operating the baseband transmitter to cause reduced interference within a passband around a frequency f, comprising:

generating a plurality of pulses at a nominal pulse repetition rate (PRF); and altering said PRF for each sequential data slot in an amount such that the average time that said at least one harmonic falls within said passband is less than 100%.

7. A method for operating the baseband transmitter as recited in claim 6, wherein altering said PRF for each sequential data slot comprises varying said PRF in a constant incremental manner.

8. A method for operating the baseband transmitter as recited in claim 7, wherein varying said PRF in a contant incremental manner comprises repeatably varying said PRF during transmitter operation.

9. A method for operating the baseband transmitter as recited in claim 6, wherein altering said PRF for each sequential data slot comprises varying said PRF in a variable manner.

10. A method for operating the baseband transmitter as recited in claim 7, wherein varying said PRF in a variable manner comprises repeatably varying said PRF during transmitter operation.

* * * * *